Feb. 5, 1963  M. LORBER  3,076,679
SEAT BELT RETAINER
Filed July 6, 1961

INVENTOR.
MORTIMER LORBER
ATTORNEY

United States Patent Office 3,076,679
Patented Feb. 5, 1963

3,076,679
SEAT BELT RETAINER
Mortimer Lorber, 4200 Cathedral Ave. NW.,
Washington 16, D.C.
Filed July 6, 1961, Ser. No. 122,123
3 Claims. (Cl. 297—385)

This invention relates to new and useful improvements in vehicle seats and safety devices and more particularly to a retainer for seat belts which may be employed in automobiles, aircraft, boats, and other vehicles.

At present, through the efforts of many safety authorities, vehicle seat belts have come into popular use as an important means of preventing or at least minimizing injuries to vehicle passengers in collisions and other accidents.

Such seat belts are usually formed of two web straps, each secured at one end to the floor or frame of the vehicle with the other end, which has a buckle or tab attached thereto, passing upwardly between the seat cushion and the back rest. These vehicle seat belts when not being used normally lie in whatever position they fall, either stretched across the seat cushion or dangling over the seat edge on the floorboard. This occurs when the passenger has left the vehicle or if he so chooses to ride without fastening his seat belt.

The lack of adequate control over the free ends of the seat belts has many undesirable effects. First, the belt may trail on the floor resulting in its becoming stepped on or otherwise soiled. Such soiling may later be transferred to the clothes of the passenger who laters wears the belt. Secondly, in an automobile or light aircraft, the belt or metal fastenings thereon may become caught or even slammed between the door sill and the door resulting in damage to the buckle mechanism, webbing, or even denting the door sill or door. Thirdly, the belt if left lying on the seat is often located beneath the passenger when he first seats himself, resulting in possible damage to the belt, the upholstery or to the clothing of the passenger as well as being uncomfortable and requiring readjustment of the passenger's position in the seat prior to being able to fasten the belt about himself. All of these occurrences diminish the utility of the seat belt as a safety device.

It is an object of the present invention to provide a means to effectively control and retain the free ends of vehicle seat belts in an out of the way but easily accessible location so that they can not be damaged nor hinder passengers when not in use.

Another object of this invention is to control the free ends of a seat belt to give a neater appearance to the seats, thereby enchancing public acceptance of seat belt installation in vehicles.

A further object of this invention is to provide a narrow strip of elastic web material secured to the seat of a vehicle and forming belt receiving sections to retain the free ends of a seat belt.

A still further object of this invention is to provide a retaining strip for the free ends of vehicle seat belts which can be easily attached to any existing vehicle seat or seatcover.

Other objects of the invention are to provide a seat belt retainer, having the above objects in mind, which is of simple construction, has a minimum number of parts, is inexpensive to manufacture, may be attached to any existing vehicle seat, and is at all times efficient, reliable and safe in operation.

For other objects and for a better understanding of the invention, reference may be had to the following detailed description taken in conjunction with the accompanying drawings in which.

Reference is now made more specifically to the drawing, wherein like numerals designate similar parts throughout the several views, and wherein a double vehicle seat or Chesterfield type seat commonly used in automobiles is shown at 10.

Figure 1:
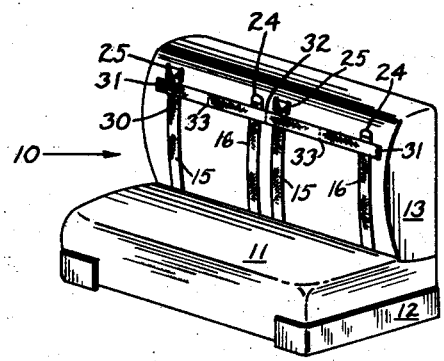
FIG. 1 is a front perspective view of a Chesterfield or double vehicle seat showing the invention applied thereto.
Figure 2:
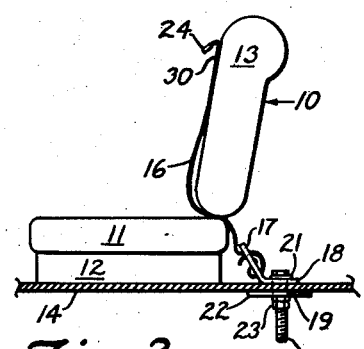
FIG. 2 is a side elevation of a vehicle seat showing how the belt is attached to the floor and also the retainer of the invention.

Such double seats as shown at 10 comprise a seat cushion 11 which rests on a seat frame 12 and a back support 13. Frame 12 normally is mounted on the floorboard or frame 14 in such a manner that it can slide forwardly and backwardly and be locked in a selected position. For the major portion of its length a space or crack remains between the cushion 11 and the back support 13.

Seat belts of the type normally employed in vehicles comprise two web straps 15 and 16 which may be fabricated from nylon or any other suitable fabric or plastic. One end of both straps 15 and 16 is adjustably secured by suitable means to the upstanding arm 17 of a generally L-shaped securing bracket 18. A hole 19 is drilled through the floorboard 14 of the automobile and a floor bolt 20 having an upper washer 21 thereon is inserted through a hole in the horizontal leg of bracket 18, hole 19 in the floorboard, and then a pressure washer 22 of rather large diameter is placed over the bolt underneath the vehicle and is drawn up tight by one or more nuts 23, providing a tight floor connection of such strength as to withstand the unusual shocks of collision loading. Of course, many other types of belt floor connections are in common use such as spring rewind reels and swivel snap hooks.

The free end of one belt 16 is normally provided with a metal or plastic protecting cap 24 and the free end of the other belt 15 has affixed thereto a metal buckle 25 of conventional construction.

In order to restrain the free ends of these belts when not in use, I provide a narrow band of elastic material 30 which is secured along the upper portion of the seat back support 13 preferably about four inches from the upper border of the back. The material preferred for this application is an elasticized heavy fabric band. However, rubber or any other resilient web may be used. The elastic band 30 may be attached directly to the upholstery or to a seat cover by doubly stitching or stapling its ends about one inch from the lateral surfaces of either a double seat back support 13 or a bucket seat back support 113. Such stitching is shown at 31 and 131 respectively. In a bucket type seat, the seat cushion is shown as 111. In addition to this stitching in the double seat, another stitch row is placed at the band center as at 32 and another 33 midway between this center stitch and each edge stitch 31. In a bucket seat as shown in FIGURE 3, one additional site of attachment is located at the center as at 132 and two are located equidistantly from the edge stitch row 131 as at 133 so as to better adapt the band to the concavity of the back support.

Figure 5:
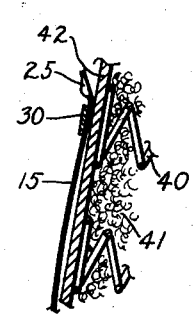
FIGURE 5 is a fragmentary sectional side elevation taken on the line 5—5 of FIGURE 3.

FIGURE 5 shows a cutaway view of a typical seat back including coil springs 40, stuffing material 41 and upholstery covering material 42, with band 30 attached thereto. It can be seen that the free end of the belts when inserted in the loop formed by the two stitch rows is held securely to the seat back by band 30.

Figure 3:
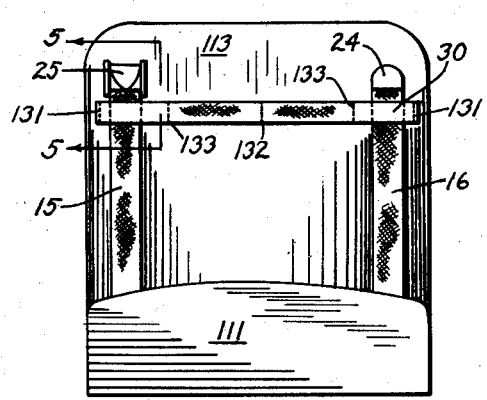
FIGURE 3 is a front elevation of a bucket type seat showing the invention applied thereto.

As can well be seen in both FIGURES 1 and 3 loops are provided in the band 30 to restrain both the buckle and the tab ends of the seat belt. These loops are wide enough to permit insertion of a relatively wide buckle and yet are elastic enough to hold a thin strap end tightly such as 16.

As the band 30 extends generally almost the entire length of the seat back to which it is attached and since the loops formed by the stitch rows are relatively wide, the device is more convenient to use than would be metal retaining clips or fabric rings. Such clips or rings would require positioning of the belt ends in predetermined locations without any added benefits of function and the possible disadvantage of poor placement for riders of different body builds who might occupy a given seat.

Figure 4:
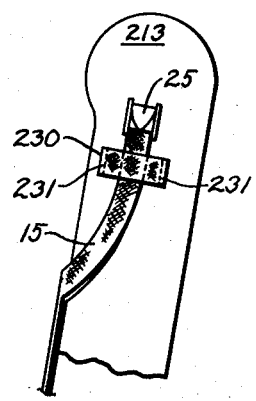
FIGURE 4 is a fragmentary side elevation of an aircraft seat showing the invention applied thereto.

FIGURE 4 shows a modified form of retaining band 230 which is attached to each of the two lateral sides of a vehicle seat back support 213. In this case the seat is of the type commonly used in aircraft. Each band 230 is relatively short in length and is stitched to the seat as at 231 so that the band is at a level below the passenger's shoulders, but along the front part of the lateral surface of back support 213. This construction keeps each half of the seat belt off of the seat itself when not in use.

Prior to riding, the passenger would slide into the seat and then bend slightly forward to pull out the elasticized band 30 and pull the free ends of the seat belt 15 and 16 down from behind the band and then fasten the belt in position about his waist. At the end of a ride, the band 30 would be pulled forwardly away from the seat back and each seat belt half would be easily inserted between the band and the seat back, thereby conveniently retaining the belt ends out of the way.

The color and texture of the fabric band may be made by well known fabrication methods to harmonize with the other fabrics used in the interior of the vehicle, thereby making the band either inconspicious or, if desired, of a contrasting color so as to be a definite part of the trim.

The retainer of the present invention will not detract from the comfort of the seat occupant as it is fabric and not metal, so that the passenger would be unaware of its presence behind him, even when sitting against it.

While I have shown and described a preferred embodiment of the invention, it is to be understood that the drawings and detailed disclosure are to be construed in an illustrative rather than a limiting sense since various modifications and substitutions of equivalents may be made by those skilled in the art within the spirit and scope of the invention as described in the appended claims.

What I claim as new and desire to protect by Letters Patent of the United States is:

1. Seat belt retaining means for attachment to a vehicle seat including a back rest comprising a band of web material secured to the front surface of the back rest of said seat at spaced points on said front surface so as to provide at least one belt receiving loop between said points.

2. Seat belt retaining means for attachment to a vehicle seat including a back rest comprising; a band of elastic web material, said band extending substantially the width of said seat and being secured adjacent each end thereof to the front surface of the back rest, and means securing said band to the front surface of the back rest intermediate the ends thereof whereby a plurality of belt receiving loops are formed.

3. In a vehicle having passenger seats therein including a back rest; the combination of safety web belts anchored securely at one end thereof within said vehicle, and belt-end retaining means secured to said back rest for retaining the free ends of said belts when they are not in use comprising a band of web material secured to the front surface of the back rest of said seat at spaced points on said front surface so as to provide at least one belt receiving loop between said points.

References Cited in the file of this patent

UNITED STATES PATENTS

| | | |
|---|---|---|
| 454,351 | Herrmann | June 16, 1891 |
| 1,268,500 | Schlegel | June 4, 1918 |
| 1,971,264 | Irwin | Aug. 21, 1934 |
| 2,848,250 | Sheren | Aug. 19, 1958 |
| 2,880,789 | Leibinger | Apr. 7, 1959 |
| 2,986,202 | Yates | May 30, 1961 |
| 2,998,008 | Klesa | Aug. 29, 1961 |

FOREIGN PATENTS

| | | |
|---|---|---|
| 24,181 | Great Britain | Oct. 30, 1906 |
| 311,015 | Switzerland | Jan. 14, 1956 |
| 1,124,239 | France | June 25, 1956 |
| 542,360 | Canada | June 18, 1957 |